United States Patent [19]
Davis

[11] 3,739,457
[45] June 19, 1973

[54] METHOD OF CONNECTING ATTACHMENTS TO FIBERGLASS RODS

[75] Inventor: Elbert Davis, Glendale, Calif.

[73] Assignee: Nupla Corporation, Sun Valley, Calif.

[22] Filed: Dec. 27, 1971

[21] Appl. No.: 212,615

Related U.S. Application Data

[63] Continuation-in-part of Ser. No. 835,135, June 20, 1969, Pat. No. 3,660,887.

[52] U.S. Cl. ............... 29/460, 24/122.6, 29/527.1, 264/262, 264/263, 287/124
[51] Int. Cl. ........................ B23p 3/00, B23p 19/04
[58] Field of Search ....................... 264/262, 263; 29/460

[56] References Cited
UNITED STATES PATENTS
3,551,960    1/1971    Little ................................... 29/460

Primary Examiner—Robert F. White
Assistant Examiner—T. E. Balhoff
Attorney—Robert C. Comstock

[57] ABSTRACT

A method of connecting an attachment to the end of a fiberglass rod, tube or other profile. The end of the rod is first separated into a plurality of segments which are held apart from each other by a spacer-spreader. A tetrafluoroethylene tape is wound around the outside of the rod segments, with a substantial amount of separation between the edges of the adjacent tape windings. The rod end is then placed within a fitting and potting compound is poured into the end of the fitting to form simultaneously a plug which completely fills the area between the segments and a socket which completely fills the area between the rod and fitting. The tape forms a slip plane along which the rod is moved within the fitting to convert longitudinal tension into lateral compression and thereby transfer the load across the entire cross-section of the rod.

4 Claims, 5 Drawing Figures

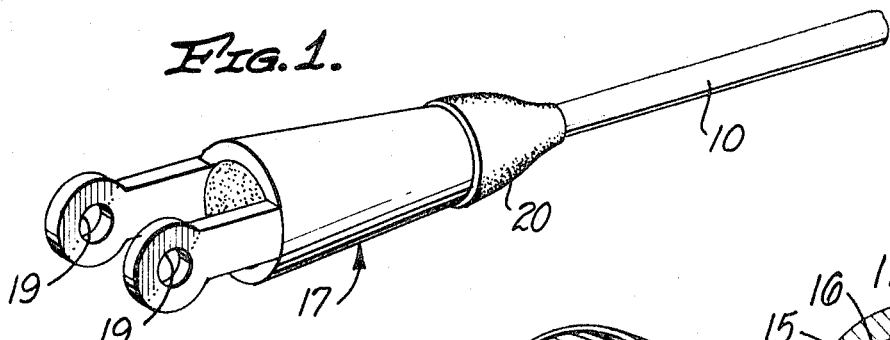
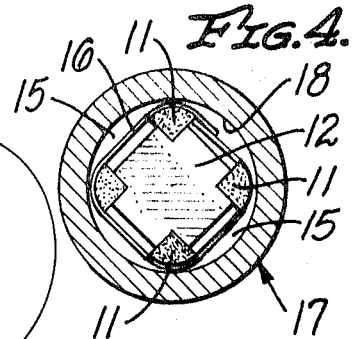
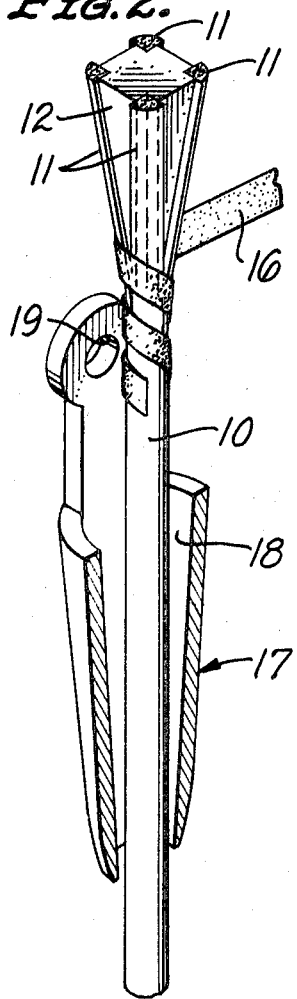
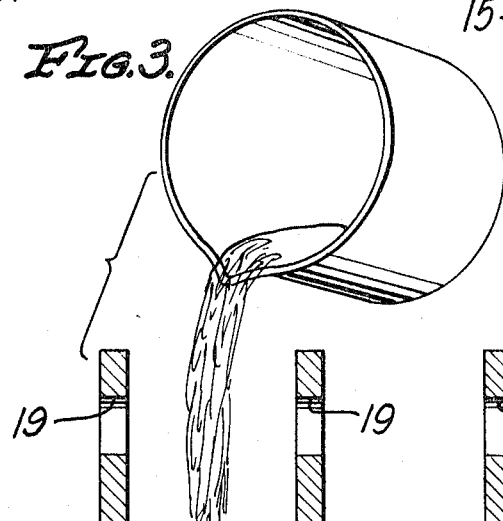
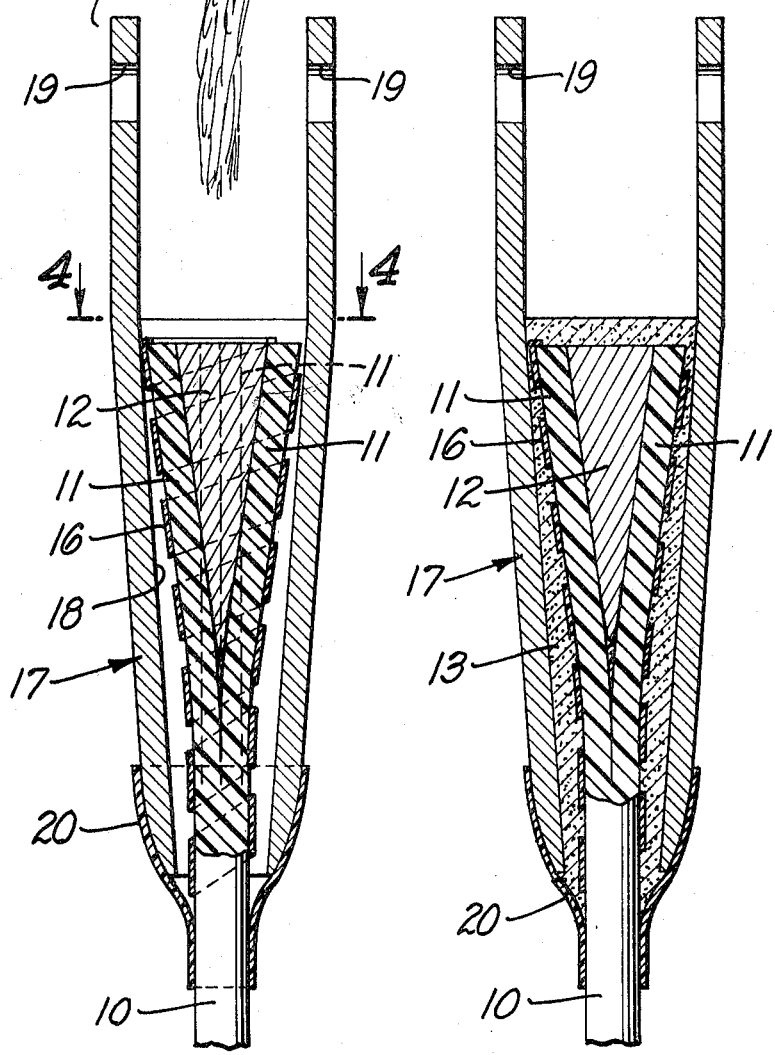

METHOD OF CONNECTING ATTACHMENTS TO FIBERGLASS RODS

REFERENCE TO RELATED APPLICATION

This application is a continuation-in-part of my application, Ser. No. 835,135 filed June 20, 1969, now U.S. Pat. No. 3,660,887.

BACKGROUND OF THE INVENTION

1. Field of the Invention

The invention relates to a method for connecting attachments to the ends of fiberglass rods, tubes and other profile shapes.

2. Description of the Prior Art

Fiberglass rods and similar shapes possess great strength, but methods used heretofore to attach end fittings to them have not been entirely satisfactory. No practical end fitting has been available which could successfully transfer loads evenly from the end attachments, such as clevises, eye bolts, hooks, pins or other attachment members, to the fiberglass rod.

When such connecting members are attached to metal rods, there is sufficient cohesion in the material itself so that a load which is applied to the surface is distributed uniformly throughout the entire cross-section of the rod. In a rod formed of fiberglass, however, the rod comprises a large number of individual glass fiber reinforcing members which are held together by a resin binder. The resin binder forms bridges between the fibers, which bridges are comparatively weak and cannot effectively transmit a load from one reinforcing member to another. It is accordingly far more difficult to transmit a load through the adhesive or binder of a fiberglass rod than through the cohesive mass of a metal or other integral rod.

Numerous devices and methods have been devised for connecting attachments to the ends of fiberglass rods. All such efforts have been unsatisfactory to a greater or lesser degree for various reasons. In many cases, the fibers are degraded and weakened by being bent, abraded, or otherwise damaged, so that they are no longer capable of carrying their full potential load.

It has been known for years that fairly satisfactory loading of fiberglass rods may be accomplished by enlarging the ends of the rod by splitting it into segments, inserting a tapered wedge and then holding these enlarged ends in a metal end attachment having a smoothly tapered frusto-conical interior portion.

However, there are several disadvantages in using this approach. When the total included angle of the interior portion of the end attachment is less than 4° or 5° there is a tendency for the enlarged rod to slip out of the end fitting or, because of the extreme mechanical advantage involved, to split the end fitting and thus fail to carry the load. When the total included angle is greater than about 20°, the glass fibers in the divided segments are likely to fracture because of excessive flexural stress.

Also, any imperfection in the fit between the enlarged rod end and the tapered interior of the end fitting will result in stress concentration, consequent fiber breakage, and therefore premature failure to carry the applied load.

Even more important than the foregoing causes of failure is the failure which results simply because the segments slip and pull out of the tapered end fitting without breaking. This type of failure occurs when the tensile forces exceed the shear strength of the resin to fiber bond. If the comprressive forces resulting from the wedge action are not sufficient to overcome these shear forces, the segments are allowed to slip out of the end fitting and the fitting fails. Similarly, a failure can occur when one or more segments slip, thereby placing all of the load on the remaining segments. Naturally, maximum breaking strength cannot be realized when only a portion of the rods' fibers are sharing the load.

End fittings which are merely clamped on to the rod have the obvious advantage of not splitting or bending the rod and thus preserving its integrity, but the length of fitting required to provide the necessary gripping area is so excessive as to make such an approach a practical impossibility and economically unreasonable.

When multi-jawed chuck type fittings are used, the rod is crushed before full strength is realized. In the case of resin potted tapered fittings, using a split rod and a tapered wedge, localized stress concentration results where the wedge causes the glass fibers to change direction, thereby throwing abnormally high loads on the fibers at this bend. In the case of spirally wrapped wire conforming "preform grips," which are intended to tighten as the load increases, the glass fibers along the surface of the rod are broken as the wire tightens and cuts into the surface, and failure is initiated prematurely.

SUMMARY OF THE INVENTION

It is the primary object of this invention to provide a method for connecting attachments to fiberglass rods so that the strength of such connections is equal to the full strength of the rod. Heretofore, end fittings used on fiberglass rods have been unsatisfactory in that the ultimate potential strength of the rods has not been effectively utilized.

In principle, maximum breaking strength may be realized in a glass fiber reinforced rod only when all the fibers are placed in tension simultaneously so as to distribute the load effectively throughout the entire cross-section of the rod. Under such an ideal condition, all the fibers are stressed equally in tension to their ultimate load carrying capacity and finally fail as a unit, resulting in the maximum possible breaking strength.

It is an object of the present invention to minimize damage to any of the glass fibers comprising the rod and to transfer the entire tensile load from the end attachment through the fitting to the surface of the rod and from this surface by compression to all of the fibers within the rod so that final failure occurs in the body of the rod rather than in or at the end fittings, thus realizing the maximum possible breaking strength. This desirable result may be accomplished only by developing progressively increasing compressive force on virtually all of the rods' fibers simultaneously inside the fitting as the tensile load is applied and this must be accomplished without applying damaging shear or bending stresses to the glass composite.

The present invention contemplates splitting the end of the rod into a plurality of segments. A spacer-spreader member is preferably used to hold the segments apart in the desired pattern.

A barrier film formed of tetrafluoroethylene tape or other suitable material is wound around the segmented end of the rod in such a manner that there is a substantial amount of space between the edges of the adjacent tape windings.

A fitting is then placed around the enlarged end of the rod. A suitable resin binder or a potting compound is then poured into the end of the fitting in order to form a plug within and a socket around the rod end simultaneously. The potting compound provides a perfectly cast internal plug which completely fills the area within the rod segments. It simultaneously provides a perfectly formed exterior socket which completely fills the area between the outer periphery of the rod and the inner wall of the fitting. The socket adheres tightly to the fitting and for practical purposes becomes a part of the fitting.

The space between the tape windings permits the potting compound to flow freely into and fill both areas simultaneously providing a faster operation with less entrapment of air and a general better casting of the plug and socket.

The barrier film provides a slip plane along which the end of the rod is capable of moving as a unit when a tensile load is applied to the rod.

No stress is exerted on the glass fibers until the rod assembly is loaded in tension and the enlarged tapered end of the rod moves in its conforming socket, such movement resulting in the development of progressively increasing compressive forces on the segments within the socket. The loading is thus transferred from the fitting in such a manner that, due to these compressive forces, the load is carried substantially equally by all of the rod fibers.

It was previously thought that the barrier film had to form a continuous slip plane over the entire exterior of the enlarged end of the rod. If tape was used to form the barrier film, the windings were overlapped for this reason. It has now unexpectedly been found that a complete slip plane is not necessary and that the invention will function with a slip plane which is less than complete because the joined areas of potting compound where there is no slip plane will shear upon substantial movement of the rod.

It is accordingly possible to fill the end of the fitting more efficiently and more effectively by spacing the tape windings and permitting the potting compound to flow through the spaces between the adjacent tape windings. This avoids any entrapment of air without adversely affecting the results when the rod is placed under tension. It has further unexpectedly been found that such a method has an advantage over the prior method in that the slippage of the rod within the fitting is slowed, which is beneficial because the fitting will not burst due to an excessive load being suddenly applied to it.

With the present invention, since the slip plane does not cover the entire area between the rod and socket, it is possible to leave part of the loading as a tensile load and to convert only part of it into a compressive load. It is accordingly possible to suit and adjust the amount of slipping action and stress conversion to the strength of the particular fitting being used.

Any variations or manufacturing tolerances in rod diameter, roundness, accuracy of splitting, size and taper of end fitting, etc., all of which were extremely critical in previous methods and structures, may now be substantially ignored. This results from the fact that the plug and socket are both individually tailored to conform to the particular configurations involved.

It is accordingly an object of the invention to provide a method for connecting attachments to the ends of fiberglass rods and the like having all of the advantages and benefits set forth above and described hereafter in further detail in this specification.

The invention also comprises such other objects, advantages and capabilities as will later more fully appear and which are inherently possessed by the invention.

While there is shown in the drawings a preferred embodiment of the invention, it should be understood that the same are susceptible of modification and change without departing from the spirit of the invention.

DESCRIPTION OF THE DRAWINGS

FIG. 1 is a perspective view of a fiberglass rod with an end fitting attachment mounted on one end thereof;

FIG. 2 is an isometric view showing the tape being wound around the end of the rod, with the fitting broken away;

FIG. 3 is a longitudinal sectional view of the assembled rod and fitting, showing the potting compound being poured into the end of the fitting;

FIG. 4 is a sectional view taken along line 4—4 of FIG. 3;

FIG. 5 is a sectional view similar to FIG. 3 after the potting compound has been poured.

DESCRIPTION OF THE PREFERRED EMBODIMENT

A preferred embodiment which has been selected to illustrate the invention comprises an elongated fiberglass rod 10 having a circular cross-sectional configuration. The end of the rod to which attachment is to be made is split into four equal segments 11. This splitting may be achieved in any desired manner, such as by driving a tapered tool inwardly from the free end of the rod 10. It is desirable that the split segments of the rod be approximately equal in cross-section.

The segments 11 of the fiberglass rod 10 are spread in a smooth gentle curve by means of a wedge shaped spacer-spreader 12. None of the fibers of the rod 10 are stressed to the point of incipient fracture by a wedge driven inside the segments. The curve taken by the segments should be a natural one determined by the fibers themselves and the cross-sectional area of the segments. The fibers thus assume a position of minimum residual stress.

The spacer-spreader 12 may be formed of any suitable material, such as metal, molded plastic or a precast part made from the same composition as the potting compound. It is desirable that the spacer-spreader 12 be tapered to conform approximately to the predicted angle of the segments, in order to minimize stress concentration.

The configuration of the spacer-spreader is subject to many variations. Holes, surface grooves or other reliefs may be incorporated in the spacer-spreader 12 to facilitate pouring of the potting compound and to release air bubbles during the casting operation.

The segments are then provided with an outer barrier film 16. The barrier film 16 may comprise any suitable material which is substantially non-adhesive with respect to the potting compound and which will accordingly form a slip plane which surrounds the end segment assembly. For example, polyethylene, polyurethane, Mylar polyester film, polyvinylidene chloride, rubber, silicone rubber, fluorinated ethylene propylene, and polytetrafluoroethylene may be used.

A preferred embodiment of the invention uses Teflon polytetrafluoroethylene tape wrapped around the split rod segments 11 to form the barrier film 16. The tapered end is spirally wrapped, preferably starting at the enlarged end, with unsintered Teflon tape such as that one-half inch wide by 4 mils thick. The tape wrapping is continued down the rod to a point which will be outside the fitting, so that no potting resin will contact the outer surface of the rod and cause later damage to fibers during loading. The tape may extend over the free end of the rod segments 11 for holding purposes.

After the barrier film 16 has been applied around the outside of the segments 11, the tape wrapped rod end is placed within an end fitting 17 having a frusto-conical tapered inner wall 18 of somewhat larger diameter than that of the expanded segments 11. The end fitting 17 may be made from any suitable high tensile structural material such as metal. The inner wall 18 of the end fitting 17 should preferably, for convenience and economy, conform approximately to the taper of the end segment assembly with the spacer-spreader 12 in place. Aligned openings 19 may be provided in the outer end of the end fitting 17 for the purpose of attaching a pin, yoke and bail assembly or other fastening means to the end fitting 17.

An elastomeric plastic seal 20 formed of material such as polyvinylidene chloride, polyurethane or silicone rubber may be used to enclose the inner end of the fitting 17 and overlap onto the rod 10. The seal 20 prevents leakage of the potting resin during assembly and provides additional weather protection and electrical insulation to the rod 10. The seal 20 preferably comprises a tube or sleeve formed of resilient or heat shrinkable material, but any material which will dam the potting material can be used.

After slipping the resilient seal 20 into position, potting resin is poured simultaneously into the two chambers formed on opposite sides of the Teflon tape barrier film 16.

The potting material may be any fluid which can be poured in place and which will harden with minimum shrinkage to a solid with good tensile strength, impact strength, and compressive strength. For example, a bisphenol A-type epoxy resin with 10 percent diethylene triamine or triethylene tetramine catalyst and 20 to 30 percent aluminum powder, glass micro spheres, or ground slica as a filler provides a practical potting resin with excellent compressive strength.

To facilitate the smooh movement and smooth transferal of load from fitting 17 to rod 10, a lubricant may be used on either or both surfaces of the barrier film 16 and/or on the inner wall 18 of the fitting 17. Such lubricant may be applied conveniently from an aerosol spray of Teflon, molybdenum disulfide, or silicone compound.

The barrier film 16 provides a slip plane along a predicted rather than a random plane, whereby none of the fibers in the rod is abraded or unevenly stressed. The outer cast portion 21 forms a perfectly matched socket which is complementary to the outer periphery of the end sent assembly and which is separated therefrom by a slip plane formed by the barrier film 16.

The present invention is particularly adapted for use in fiberglass rods which are used as guy strain insulators and antenna guy rods and other structural tensioning devices for use in high voltage and high frequency environments.

The method and structures of the invention may be applied to any profile shape which is capable of being split, splayed, separated, unravelled, untwisted or otherwise modified at its ends to form an enlarged tapered portion.

Such a tapered portion need only be held or spread in such enlarged tapered configuration long enough (1) to apply to its outer surface a barrier film having a low coefficient of friction (2) to cast in the interior of such tapered portion a perfectly conforming tapered displacement plug shaped structure and (3) to cast simultaneously on the exterior of such barrier film a perfectly conforming socket which fits the exterior surface of the enlarged tapered portion of the profile shape and at the same time fits the interior tapered portion of an appropriate retaining shell or fitting attachment.

Solid fiberglass composite rods with oval or rectangular cross-section may be treated as round rods. That is, the split segments may be spread so as to graduate smoothly from the rods' specific cross-section to a circular configuration at the outer opening of the end fitting. Te fitting may follow the same general shape or may have a smoothly tapered frusto-conical interior, with the excess space being filled by the cast potting resin. Similarly, a tubular composite may be enlarged at its end to form a smoothly tapered configuration.

A rod need not necessarily be a solid bonded composite, since this invention makes possible the application of a single common end fitting to a plurality of rods or strands. For example, a number of small diameter rods, which provide the strength of a single large diameter rod, but also offer the advantage of flexibility and coilability, may be spread and/or split at their ends and potted in accordance with the invention (with suitable spreaders) as if the separate segments were all part of a larger single rod.

As another example, a large number of separate flexible strands such as rubber bonded fiberglass tire cord may be treated as a unit whether the separate strands are bonded into a composite or not. To practice the present invention, the strands are treated the same as split segments of a rod or strands of a rope and potted in a tapered configuration with a lubricating barrier and a conforming potted supporting cavity.

As long as the principles of this invention are followed, end fittings may be constructed for any profile shape which can be separated at its ends into a plurality of segments, bundles, strands, fibers, or other element of the composite profile. All that is required is that the appropriate regions be spread, potted, tapered, lubricated and retained in tapered mating cavities as described.

Such a rope or profile shape is separated at its ends by splitting, untwisting, or by other physical or chemical means into a plurality of elements. These elements are spread into a tapered configuration by any convenient means such as positioning them over a supporting grid or screen or by holding them temporarily on the interior surface of a tapered cavity for an intermediate potting step.

Such tapered structure is then lubricated or wrapped with a barrier film having a low coefficient of friction and potted within a retaining shell so as to produce simultaneously a tapered wedge shaped casting within the barrier and a tapered socket casting outside the barrier conforming perfectly both to the wedge shaped casting and to the retaining shell.

When longitudinal tension is applied to the rod, the end of the rod will slip within the socket and fitting surrounding it, this slippage taking place along the slip plane defined and provided by the barrier film. The areas of joined potting compound between the tape windings will shear as the rod moves. The longitudinal movement of the end of the rod acts to increase the lateral compression and thereby transfer the load across the entire cross-section of the rod. The invention provides a means of achieving or closely approaching the ideal of having each of the rod fibers carry an equal share of the load.

As pointed out above, the present invention is an improvement over my prior method in that the potting action is more rapid and more complete, with no voids or entrapment of air, and because the amount and speed of slippage can be controlled and reduced by varying the widths of the tape windings and the separation between them.

This invention makes it possible to achieve various results by providing different amounts of separation or spacing between the adjacent tape windings. For example, if the separation is made quite narrow, such as a distance substantially less than the width of the tape itself, to provide openings which are only wide enough to permit the potting compound to flow through, this will provide minimum joined areas which will not substantially restrict the longitudinal movement of the rod. The effect will accordingly be similar to providing a continuous slip plane.

On the other hand, the spacing between the windings may be made substantially larger for the purpose of increasing the size of the joined areas. This will restrict or limit the longitudinal movement of the rod in order to prevent the sudden application of an excessive lead to the fitting, which might result in damage to the fitting.

I claim:

1. A method of connecting an attachment to the end of a solid elongated member having a multiplicity of non-metallic strands, which includes placing around the end of said rod a fitting, spreading the end of said rod to form an outwardly tapering enlargement, winding around the exterior of such enlargement a relatively thin barrier film tape of friction reducing material, the adjacent edges of the tape windings being spaced apart from each other to permit potting material to flow therebetween and still permit subsequent longitudinal movement of said rod, moving said fitting into a position surrounding said enlargement, and pouring potting compound or the like into the end of said fitting, said potting compound flowing through the spaces between the windings of said tape to fill the entire area within the interior of the spread end of said rod and between the exterior of said spread end and the interior of said fitting to form a cast-in-place plug within said rod end and a simultaneously cast-in-place socket surrounding said rod end and formed completely complementarily thereto, said tape forming a slip plane between said enlargement and said socket whereby upon the application of longitudinal tension to said elongated member, said enlargement and all of the strands of said member are adapted to move simultaneously as a unit within said socket and along said slip plane to increase the lateral compression on all of said strands simultaneously and thereby convert said longitudinal tension into lateral compression which transfers the load across the entire cross-section of the portion of said elongated member disposed within said socket, the joined portions of said potting compound extending between said tape windings being sheared upon substantial longitudinal movement of the end of said rod.

2. The method described in claim 1, and spacing the adjacent edges of said windings apart from each other a distance which is substantially less than the width of said tape, whereby said potting compound may flow through the spaces between said windings while providing relatively narrow joined areas between said windings which must be sheared upon the longitudinal movement of said rod.

3. The method described in claim 1, and spacing said windings a substantial distance apart from each other to provide relatively wide joined areas of potting compound between said windings, said joined areas, while permitting longitudinal movement of said rod, acting to prevent sudden longitudinal movement of said rod and thereby restrict the initial application of lateral force to said fitting to prevent damage to said fitting.

4. The method described in claim 1, and controlling the amount of speed and slippage of said rod by adjusting the width of said tape windings and the separation therebetween, thereby controlling the amount of longitudinal tension on said rod which is converted into lateral compression.

* * * * *